United States Patent
Hasegawa

(10) Patent No.: US 8,649,064 B2
(45) Date of Patent: Feb. 11, 2014

(54) PRINTING DEVICE CAPABLE OF PRINTING IMAGE OF IMAGE FILE

(75) Inventor: Tomohiko Hasegawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 591 days.

(21) Appl. No.: 12/626,176

(22) Filed: Nov. 25, 2009

(65) Prior Publication Data

US 2010/0134847 A1 Jun. 3, 2010

(30) Foreign Application Priority Data

Nov. 28, 2008 (JP) ................................. 2008-304804

(51) Int. Cl.
*G06T 5/00* (2006.01)
(52) U.S. Cl.
USPC ........ 358/3.26; 358/1.15; 358/1.18; 358/519; 358/518; 386/288; 386/225; 386/248; 386/227; 386/278; 386/281; 382/254; 382/305; 715/792; 715/723; 715/716; 715/781; 715/854; 348/333.05; 348/333.01; 348/231.3; 348/207.99

(58) Field of Classification Search
None
See application file for complete search history.

(56) References Cited

U.S. PATENT DOCUMENTS

| | | | |
|---|---|---|---|
| 5,404,316 A * | 4/1995 | Klingler et al. | 715/723 |
| 5,689,610 A | 11/1997 | Manico et al. | |
| 5,706,097 A | 1/1998 | Schelling et al. | |
| 5,963,204 A * | 10/1999 | Ikeda et al. | 715/723 |
| 6,028,603 A * | 2/2000 | Wang et al. | 715/776 |
| 6,453,078 B2 * | 9/2002 | Bubie et al. | 382/305 |
| 6,456,391 B1 | 9/2002 | Miyamoto et al. | |
| 6,456,779 B1 * | 9/2002 | Saib | 386/281 |
| 6,657,637 B1 | 12/2003 | Inagaki et al. | |
| 6,701,011 B1 | 3/2004 | Nakajima | |
| 6,795,212 B1 | 9/2004 | Ichikawa | |
| 6,807,361 B1 * | 10/2004 | Girgensohn et al. | 386/227 |
| 6,816,552 B2 | 11/2004 | Demos | |

(Continued)

FOREIGN PATENT DOCUMENTS

| | | |
|---|---|---|
| EP | 1973328 A1 | 9/2008 |
| JP | H01-081574 | 3/1989 |

(Continued)

OTHER PUBLICATIONS

David Kappos, Subject Matter Eligibility of Computer Readable Media, Feb. 23, 2010, US Patent and Trademark Office, 1351 OG 212.*

(Continued)

*Primary Examiner* — King Poon
*Assistant Examiner* — Ted Barnes
(74) *Attorney, Agent, or Firm* — Sculy, Scott, Murphy & Presser PC

(57) ABSTRACT

In order to correct image files to be printed in a printing device, there is provided a printing device including: an inputting unit that is configured to be capable of inputting an image file representing a motion image; a generating unit that is configured to extract a plurality of frame images from the image file and to generate a first output image in which the plurality of extracted frame images are laid out on a single page; correcting unit that is configured to correct the first output image and to generate a first corrected output image; and a printing unit that is configured to be capable of printing the first corrected output image.

13 Claims, 14 Drawing Sheets

(56) References Cited

U.S. PATENT DOCUMENTS

| | | | |
|---|---|---|---|
| 6,902,760 B2 | 6/2005 | Wefringhaus et al. | |
| 6,903,760 B2 | 6/2005 | McFarland et al. | |
| 6,945,716 B2 | 9/2005 | Kawamoto | |
| 7,145,601 B2 * | 12/2006 | Misawa et al. | 348/333.05 |
| 7,196,727 B2 * | 3/2007 | Sato | 348/333.11 |
| 7,266,150 B2 | 9/2007 | Demos | |
| 7,277,192 B2 * | 10/2007 | Kotani et al. | 358/1.13 |
| 7,313,280 B2 | 12/2007 | Murai et al. | |
| 7,495,795 B2 * | 2/2009 | Graham et al. | 358/1.18 |
| 7,511,849 B2 * | 3/2009 | Matsuhira | 358/1.15 |
| 7,540,011 B2 * | 5/2009 | Wixson et al. | 725/52 |
| 7,656,451 B2 * | 2/2010 | Yanagi | 348/333.11 |
| 7,720,349 B2 * | 5/2010 | Ogikubo | 386/278 |
| 7,760,956 B2 | 7/2010 | Lin et al. | |
| 7,839,512 B2 * | 11/2010 | Kotani et al. | 358/1.13 |
| 7,911,511 B2 | 3/2011 | Yoshikawa et al. | |
| 7,954,056 B2 * | 5/2011 | Graham | 715/716 |
| 8,094,990 B2 | 1/2012 | Ichikawa | |
| 8,149,286 B2 | 4/2012 | Takagi et al. | |
| 8,150,194 B2 | 4/2012 | Fujibayashi et al. | |
| 8,185,842 B2 | 5/2012 | Chang et al. | |
| 8,249,397 B2 | 8/2012 | Wood et al. | |
| 8,311,393 B2 | 11/2012 | Kawaoka | |
| 8,332,757 B1 * | 12/2012 | Davey et al. | 715/716 |
| 2002/0048043 A1 * | 4/2002 | Takahashi et al. | 358/1.15 |
| 2003/0112871 A1 | 6/2003 | Demos | |
| 2003/0142199 A1 | 7/2003 | McFarland et al. | |
| 2003/0184826 A1 * | 10/2003 | Takemoto et al. | 358/518 |
| 2003/0231862 A1 * | 12/2003 | Kawaoka | 386/52 |
| 2004/0005004 A1 | 1/2004 | Demos | |
| 2004/0226467 A1 | 11/2004 | Underwood et al. | |
| 2004/0247199 A1 | 12/2004 | Murai et al. | |
| 2005/0002063 A1 * | 1/2005 | Hanamoto | 358/1.18 |
| 2005/0033758 A1 * | 2/2005 | Baxter | 707/100 |
| 2005/0097475 A1 * | 5/2005 | Makioka et al. | 715/792 |
| 2005/0134946 A1 * | 6/2005 | Tsue et al. | 358/537 |
| 2005/0185201 A1 | 8/2005 | Kuwata | |
| 2006/0132637 A1 * | 6/2006 | Imanura | 348/333.01 |
| 2006/0288304 A1 * | 12/2006 | Nomoto et al. | 715/781 |
| 2007/0003222 A1 * | 1/2007 | Shingai | 386/95 |
| 2007/0053668 A1 * | 3/2007 | Misawa et al. | 386/121 |
| 2007/0146504 A1 * | 6/2007 | Morimoto et al. | 348/231.3 |
| 2007/0223049 A1 * | 9/2007 | Araya et al. | 358/302 |
| 2007/0258655 A1 * | 11/2007 | Motominami | 382/254 |
| 2007/0285573 A1 | 12/2007 | Ichikawa | |
| 2008/0066016 A1 * | 3/2008 | Dowdy et al. | 715/854 |
| 2008/0088706 A1 * | 4/2008 | Girgensohn et al. | 348/207.99 |
| 2008/0151317 A1 * | 6/2008 | Imine | 358/403 |
| 2008/0174747 A1 * | 7/2008 | Fujinawa et al. | 353/122 |
| 2008/0231741 A1 | 9/2008 | McIntyre et al. | |
| 2009/0009530 A1 | 1/2009 | Araki et al. | |
| 2009/0080020 A1 * | 3/2009 | Kitagawa | 358/1.15 |
| 2009/0086044 A1 * | 4/2009 | Kinemura | 348/220.1 |
| 2009/0116811 A1 * | 5/2009 | Kukreja et al. | 386/52 |
| 2009/0316056 A1 | 12/2009 | Rosencwaig et al. | |

FOREIGN PATENT DOCUMENTS

| | | |
|---|---|---|
| JP | 2000-98514 | 4/2000 |
| JP | 2001-197445 | 7/2001 |
| JP | 2003-299001 | 10/2003 |
| JP | 2004-64231 | 2/2004 |
| JP | 2004-282377 A | 10/2004 |
| JP | 2005-130254 | 5/2005 |
| JP | 2005-160020 A | 6/2005 |
| JP | 2006-011754 | 1/2006 |
| JP | 2006-513592 A | 4/2006 |
| JP | 2007-110224 | 4/2007 |
| JP | 2007-221301 | 8/2007 |
| JP | 2007-266862 | 10/2007 |
| JP | 2008-022482 | 1/2008 |
| JP | 4081736 | 2/2008 |
| JP | 2008-80522 | 4/2008 |
| JP | 2008-271594 A | 11/2008 |

OTHER PUBLICATIONS

English-language Abstract Japanese Patent Publication No. 2001-078127, dated Mar. 23, 2001.
Extended European Search Report dated Nov. 5, 2010.
Japanese Official Action mailed Dec. 7, 2010 in corresponding Japanese Patent Application No. 2008-304804, together with an English language translation.
Office Action dated Mar. 6, 2012 received in a related U.S. Appl. No. 12/626,165.
Office Action dated Mar. 12, 2012 received in a related U.S. Appl. No. 12/626,184.
Japanese Official Action dated Jul. 27, 2010 with English translation.
Chinese Official Action mailed Aug. 31, 2011 in corresponding Chinese Patent Application No. 200910225847.9 of related U.S. Appl. No. 12/626,184, together with an English language translation.
Japanese Official Action dated Sep. 7, 2010 with English translation.
European Official Action dated Mar. 4, 2013 from related European Patent Application 09014747.1.
U.S. Final Office Action dated Sep. 7, 2012, received in related U.S. Appl. No. 12/626,165.
U.S. Final Office Action dated Sep. 13, 2012, received in related U.S. Appl. No. 12/626,184.
U.S. Office Action dated Nov. 7, 2012 in related U.S. Appl. No. 12/817,713.
Japanese Office Action dated May 7, 2013 issued in JP 2009-158008 filed Apr. 22, 2013.
Japanese Office Action dated Feb. 5, 2013 issued in related Japanese Patent Application 2009-158008.
US Office Action dated Jun. 7, 2013 from related U.S. Appl. No. 12/626,184, filed Nov. 25, 2009.
US Office Action dated Sep. 23, 2013 from related U.S. Appl. No. 12/817,713.
US Office Action dated Oct. 1, 2013 from related U.S. Appl. No. 12/626,165.
US Office Action dated Oct. 30, 2013 from related U.S. Appl. No. 12/626,184.

* cited by examiner

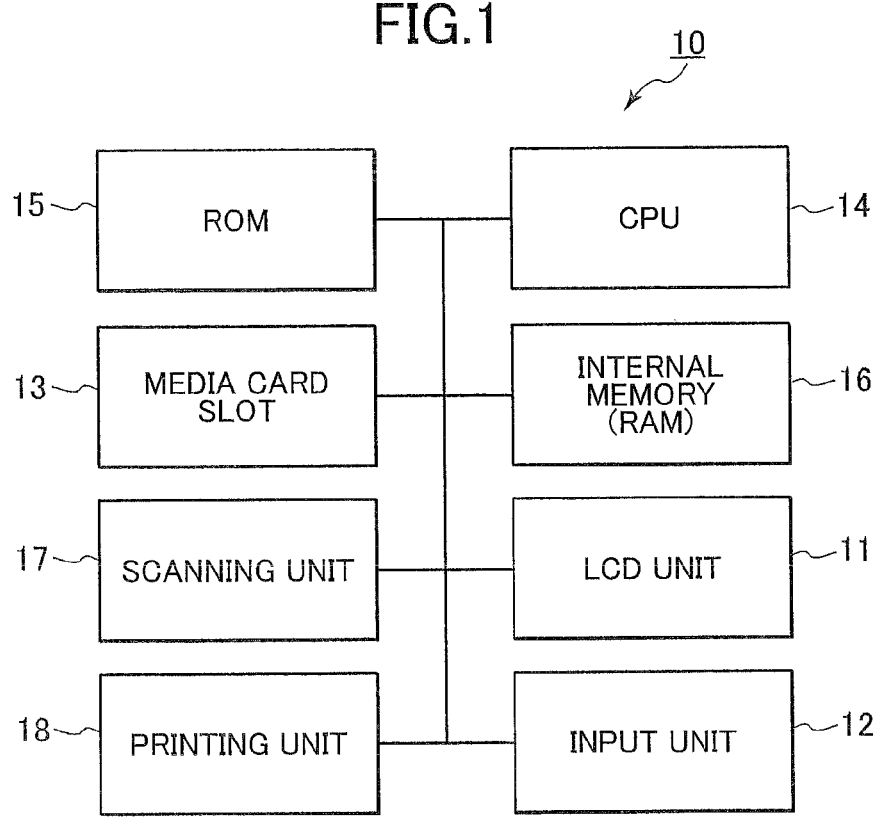
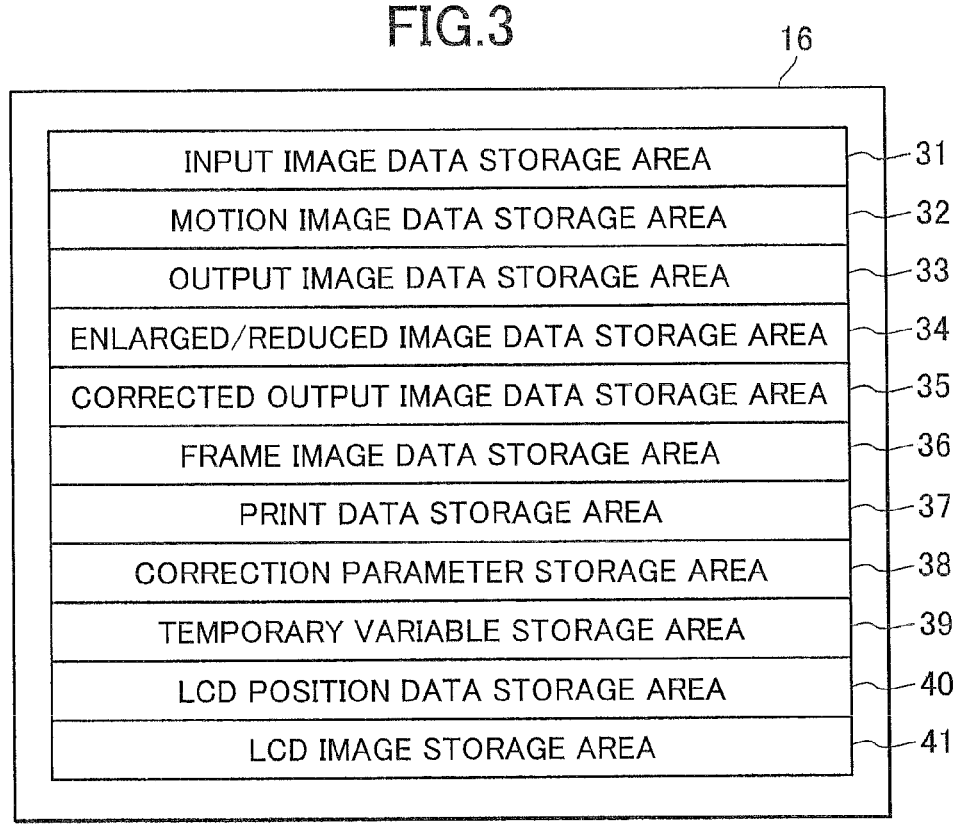

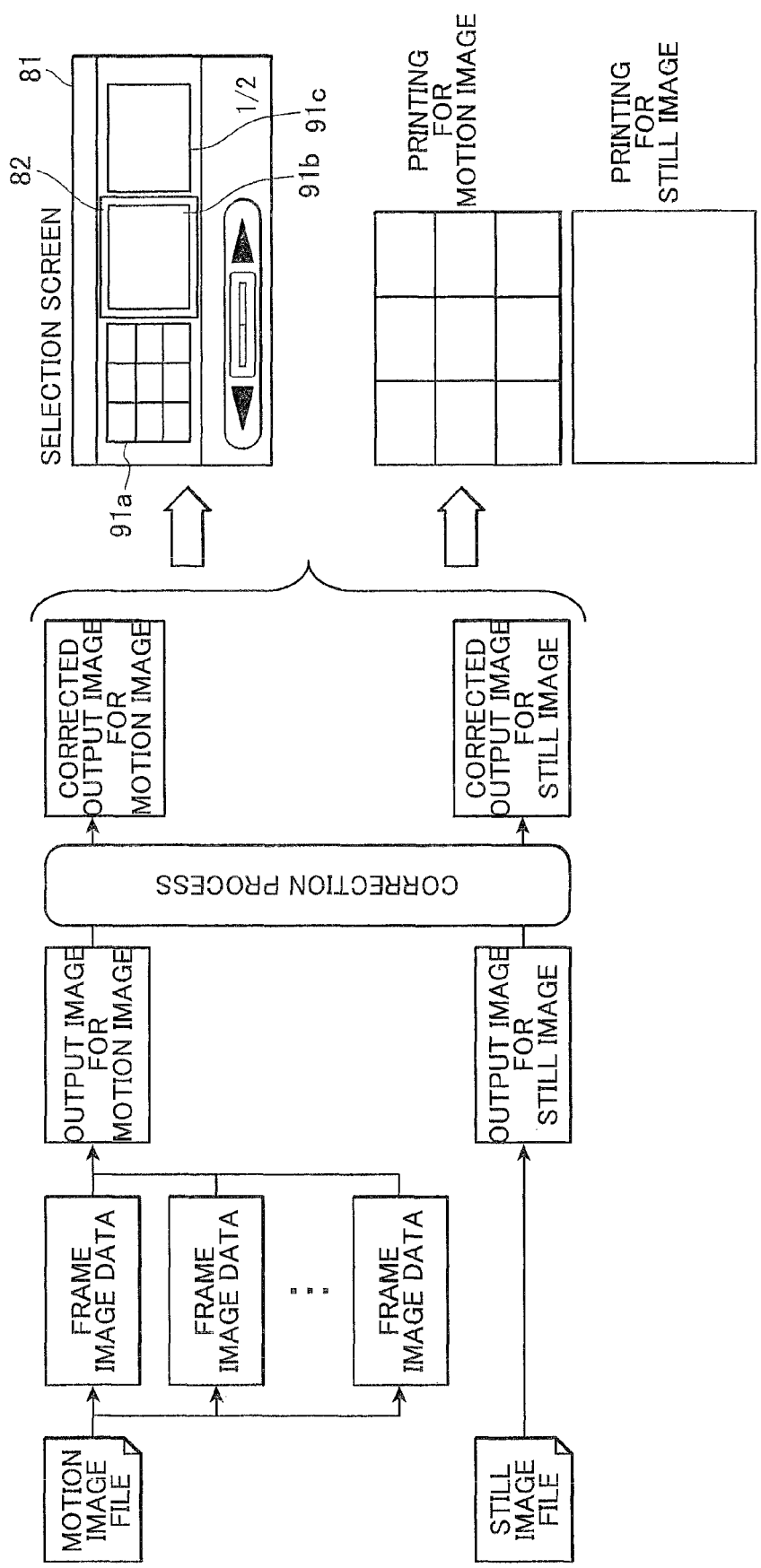

FIG.4

| 51 | 52 | 53 | |
|---|---|---|---|
| 0 | "IMG01.jpg" | 2885 | 31 |
| 1 | "IMG02.avi" | 18000 | |
| 2 | "IMG03.mov" | 58763 | |
| 3 | "IMG04.jpg" | 4381 | |

| | | | |
|---|---|---|---|
| 0 | | | 61 |
| 1 | | | 62 |
| 640 | | | 63 |
| 480 | | | 64 |
| 1060 | | | 65 |
| 1080000 | 7520000 | 14200000 | |
| 20640000 | 27100000 | 33640000 | 66 |
| 40200000 | 46300000 | 53090000 | |
| 40500 | 37650 | 43200 | |
| 38900 | 26000 | 32700 | 67 |
| 36690 | 29290 | 41810 | |

| FORMAT NAME | ASSIGNED NUMBER |
|---|---|
| AVI FORMAT | 0 |
| MOV FORMAT | 1 |
| MPEG FORMAT | 2 |

| CODEC NAME | ASSIGNED NUMBER |
|---|---|
| MotionJPEG CODEC | 0 |
| MPEG1 CODEC | 1 |
| DivX CODEC | 2 |

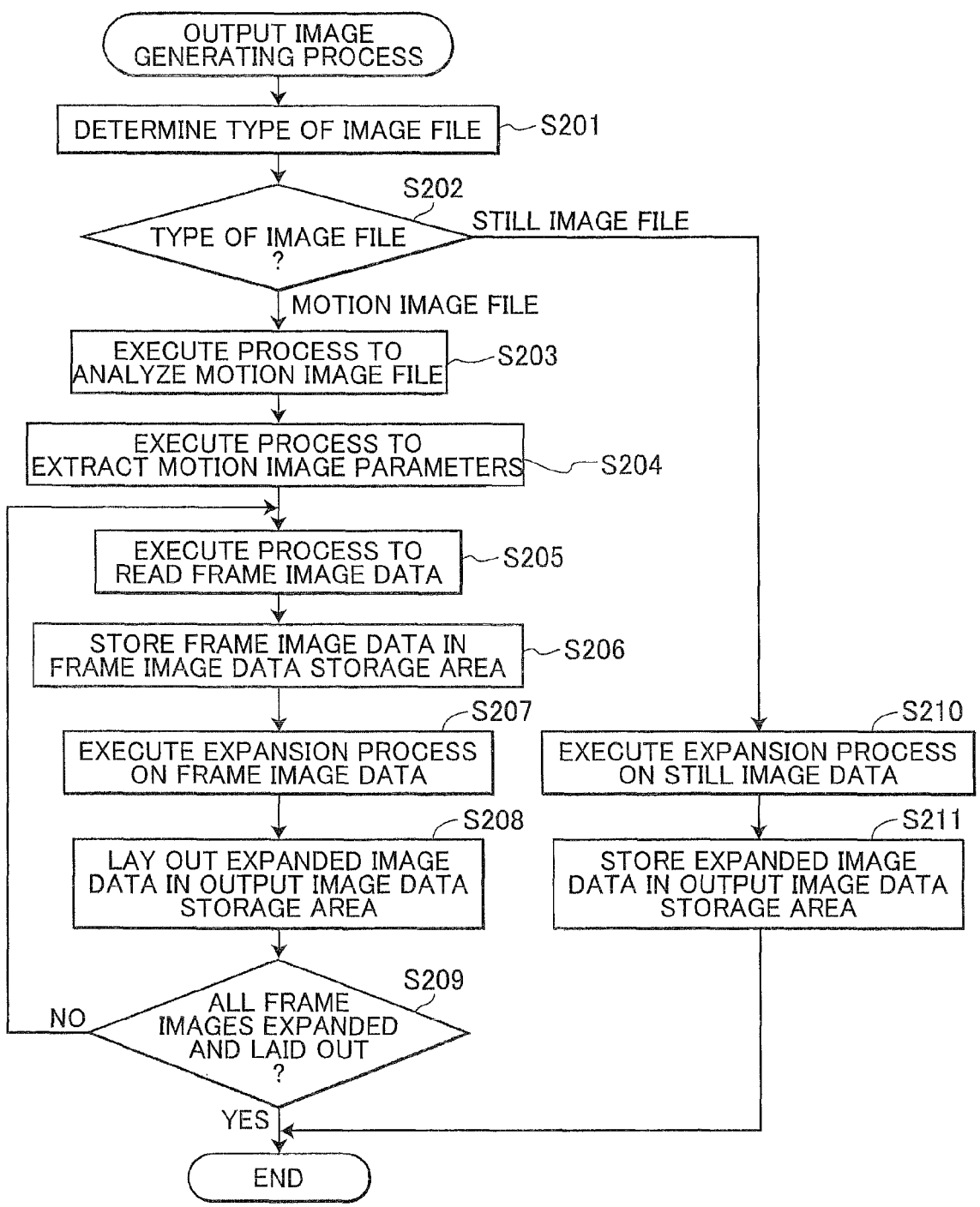

FIG.13A

| 0th FRAME | 1st FRAME | 2nd FRAME |
|---|---|---|
| 3rd FRAME | 4th FRAME | 5th FRAME |
| 6th FRAME | 7th FRAME | 8th FRAME |

STILL IMAGE

~33

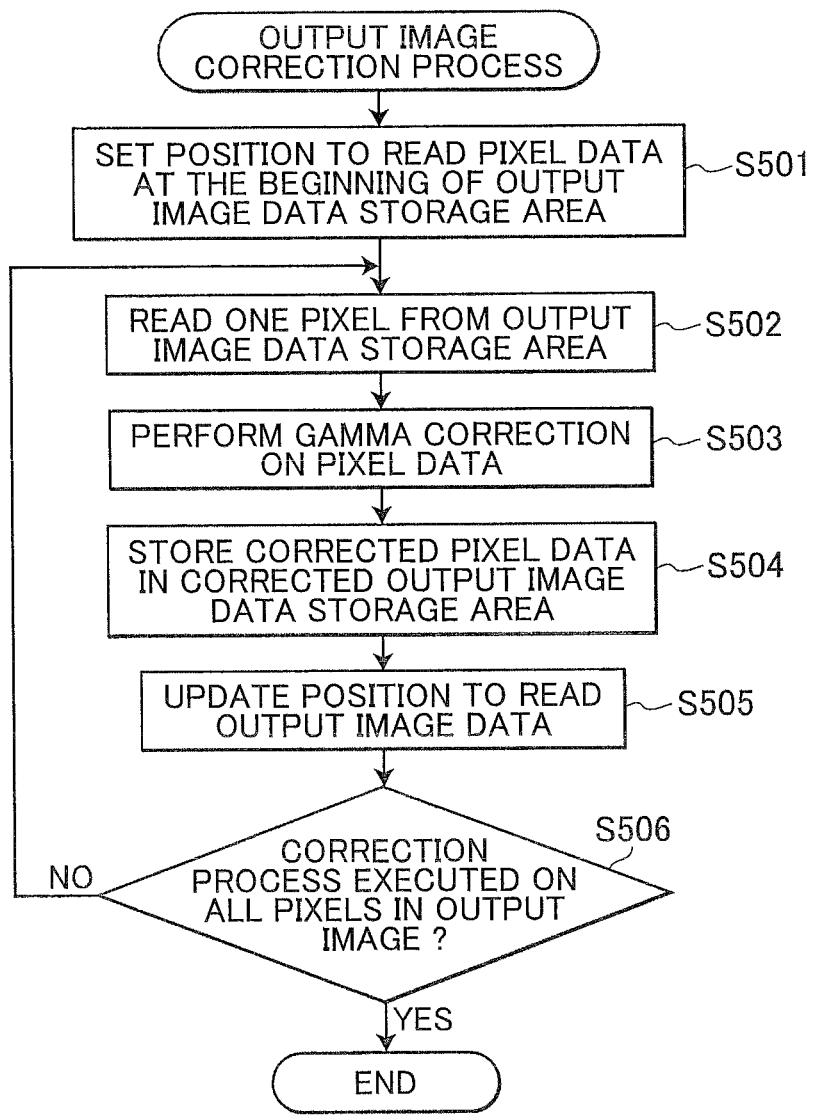

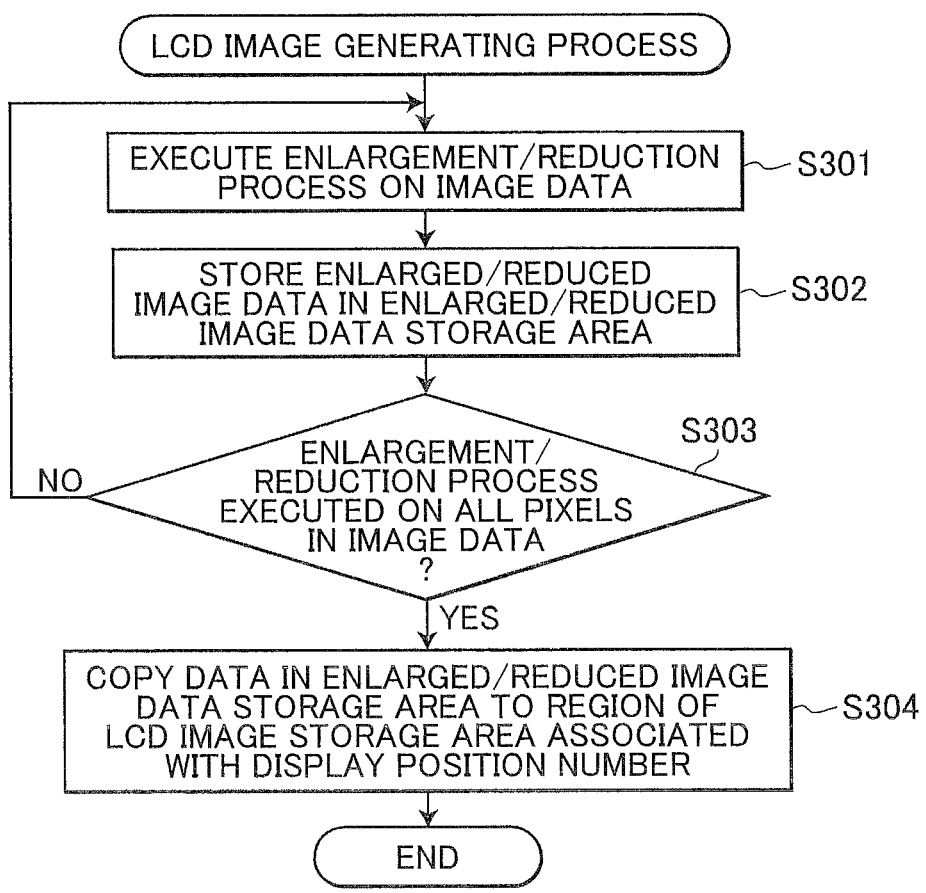

PRINTING DEVICE CAPABLE OF PRINTING IMAGE OF IMAGE FILE

CROSS REFERENCE TO RELATED APPLICATION

This application claims priority from Japanese Patent Application No. 2008-304804 filed Nov. 28, 2008. The entire content of the priority application is incorporated herein by reference.

TECHNICAL FIELD

The present invention relates to a printing device for printing an image based on data in an image file.

BACKGROUND

A conventional printing device well known in the art reads image files representing photographs or other still images (still image files) from a storage medium, and prints out the still images represented by the image files. Recently, there have also been proposals for printing devices capable of printing out not only still image files, but also image files representing motion images (motion image files).

Since a motion image represented by a motion image file is configured of an enormous number of frame images, making it impractical to print all of the frame images, the printing device prints only specific frame images extracted from the file. The printing device is configured to be able to print a plurality of frame images extracted from a motion image file in an arrangement on a single page, for example.

The conventional printing device is also configured to perform corrections on the frame images extracted from the motion image file. When one of the plurality of frame images arranged on a single page is selected and corrected with particular settings, such settings are configured to be applied automatically to corrections to be performed on the rest of the frame images.

However, the conventional printing device described above performs correction on each frame image. Since each of the plurality of frame images needs to be corrected, processing time required to complete corrections on all the frame images inevitably becomes longer.

SUMMARY

In view of the foregoing, it is an object of the present invention to provide a printing device capable of correcting an image file in a more efficient manner.

In order to attain the above and other objects, there is provided a printing device including: an inputting unit that is configured to be capable of inputting an image file representing a motion image; a generating unit that is configured to extract a plurality of frame images from the image file and to generate a first output image in which the plurality of extracted frame images are laid out on a single page; a correcting unit that is configured to correct the first output image and to generate a first corrected output image; and a printing unit that is configured to be capable of printing the first corrected output image.

According to another aspect of the present invention, there is provided a storage medium storing a program executable on a printing device. The program is provided with a set of program instructions including: inputting an image file representing a motion image; extracting a plurality of frame images from the image file and generating a first output image in which the plurality of extracted frame images are laid out on a single page; correcting the first output image to generate a first corrected output image; and printing the first corrected output image.

According to further aspect of the present invention, there is provided a storage medium storing a program executable on a computer. The program is provided with a set of program instructions including: inputting an image file representing a motion image; extracting a plurality of frame images from the image file and generating a first output image in which the plurality of extracted frame images are laid out on a single page; correcting the first output image to generate a first corrected output image; and controlling a printing device to print the first corrected output image.

BRIEF DESCRIPTION OF TUE DRAWINGS

In the drawings;

FIG. 1 is a block diagram illustrating an electrical configuration of a multifunctional peripheral according to a first embodiment of the present invention including a CPU, an internal memory (RAM) and an LCD unit;

FIG. 2 is an overview illustrating a series of processes performed by the multifunctional peripheral according to the first embodiment;

FIG. 3 is a conceptual diagram explaining storage areas of the RAM in the multifunctional peripheral according to the first embodiment;

FIG. 4 is a view conceptually illustrating an input image data storage area of the RAM in the multifunctional peripheral according to the first embodiment;

FIG. 5 is a view conceptually illustrating a motion image data storage area of the RAM in the multifunctional peripheral according to the first embodiment;

FIG. 12 is a flowchart of an output image generation process in the media image printing process according to the first embodiment;

FIG. 13A is an explanatory view of an output image data storage area in which frame images extracted from a motion image file are laid out according to the first embodiment;

FIG. 13B is an explanatory view of the output image data storage area in which a still image is laid out according to the first embodiment;

FIG. 14 is a flowchart of an output image correction process in the media image printing process according to the first embodiment;

FIG. 15 is a flowchart of an LCD image generating process in the media image printing process according to the first embodiment;

DETAILED DESCRIPTION

Figures 6A, 6B, 7:
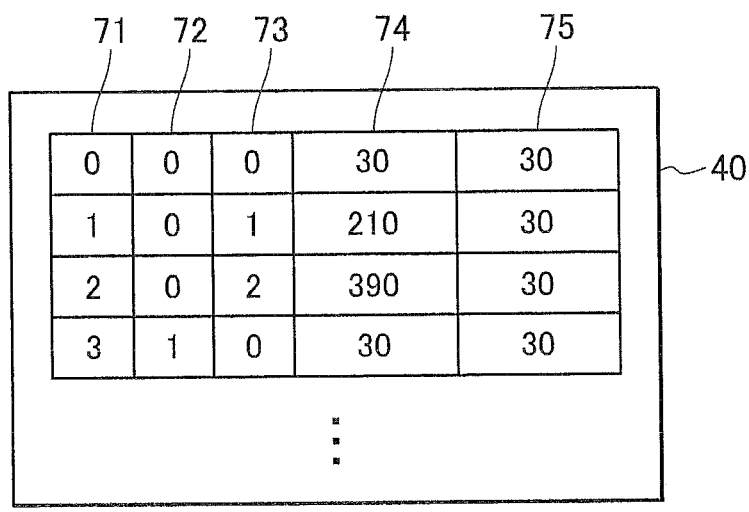
FIG. 6A is an explanatory view showing types of file format of motion image files and corresponding numbers associated therewith in the first embodiment.
FIG. 6B is an explanatory view showing types of codec of motion image files and corresponding numbers associated therewith in the first embodiment.
FIG. 7 is a view conceptually illustrating an LCD position data storage area of the RAM in the multifunctional peripheral according to the first embodiment.

First, a general configuration of a multifunctional peripheral 10 (hereinafter to be referred to as the "MFP 10") according to a first embodiment of the present invention will be described with reference to FIG. 1.

The MFP 10 is provided with various functions, including a printer function, a scanner function, and a color copier function. As shown in FIG. 1, the MFP 10 is provided with a CPU 14, a ROM 15, an internal memory (RAM) 16, an LCD unit 11, an input unit 12, a media card slot 13, a scanning unit 17 and a printing unit 18 that are interconnected with each other by signal lines.

The CPU 14 performs all computations for the MFP 10. The ROM 15 has prestored programs that the CPU 14 executes in order to implement processes described later. The RAM 16 temporarily stores results of computations performed by the CPU 14, inputted data, and the like.

The LCD unit 11 displays images on a compact color liquid crystal display including images of character strings for messages.

The input unit 12 has various operating keys that the user can press, and inputs data based on the pressed keys. More specifically, the input unit 12 includes an Up key, a Down key, a Left key, and a Right key for moving a cursor up, down, left, and right; and an OK key for accepting a selection. The LCD unit 11 and the input unit 12 serve as a user interface of the MFP 10.

The scanning unit 17 scans an image of a document placed on a platen and generates image data representing the scanned image. The printing unit 18 prints image data specified in a print command.

The media card slot 13 receives a media card inserted thereinto, such as an SD card and a CompactFlash card (portable, non-volatile storage media). The MFP 10 also has a direct print function for directly reading image files from a media card inserted in the media card slot 13 and printing images represented by the image files.

The image files discussed herein include both still image files representing still images, and motion image files representing motion images and configured of a plurality of frame images. When the image file to be printed is a motion image file, the MFP 10 extracts a prescribed number (nine in the present embodiment) of frame images from the plurality of frame images constituting the motion image represented by the motion image file, and prints an image (an output image) having the extracted frame images laid out on a single page (See FIG. 13A). When the image file to be printed is a still image file, the MFP 10 prints, as an output image, the still image represented by the still image file on a single page (See FIG. 13B).

The MFP 10 also displays a selection screen 81 such as that shown in FIG. 2 on the LCD unit 11, enabling the user to select an image file to be printed from among the plurality of image files stored on the media card and prints images represented by the selected image files. More specifically, the MFP 10 displays output images for all of the image files that are candidates for printing in the selection screen 81 as thumbnail images, from which thumbnail images the user can tell what the output images will look like when the image files are actually printed (hereinafter referred to as the "print images"). The thumbnail images representing still image files and motion image files are the same size.

Next, an overview of a series of processes executed by the MFP 10 according to the first embodiment will be described with reference to FIG. 2.

In the processes, the MFP 10 extracts data for nine frame images from each motion image file and generates data of an output image by sequentially laying out each of the nine extracted frame images in a storage area (output image data storage area 33) representing a single page, as shown in FIG. 13A. The MFP 10 also generates data of an output image for each still image file in which only one still image represented by the still image file is laid out on a single page, as shown in FIG. 13B. Next, the MFP 10 displays the output image for each image file as a thumbnail image in the selection screen 81 after reducing or enlarging the output image to a prescribed size. When the user selects an image file, the MFP 10 prints the output image of the selected image file.

In particular, the MFP 10 according to the present embodiment performs correction on the output image for each image file.

Next, storage areas of the RAM 16 will be described with reference to FIGS. 3 through 10.

As shown in FIG. 3, the RAM 16 is configured with various storage areas for storing different types of data. The storage areas include an input image data storage area 31, a motion image data storage area 32, an output image data storage area 33, an enlarged/reduced image data storage area 34, a corrected output image data storage area 35, a frame image data storage area 36, a print data storage area 37, a correction parameter storage area 38, a temporary variable storage area 39, an LCD position data storage area 40, and an LCD image storage area 41.

The input image data storage area 31 serves to store data on image files stored on a media card inserted in the media cart slot 13. As shown in FIG. 4, the input image data storage area 31 is divided into an input image ID storage area 51, an input image filename storage area 52, and an input image file size storage area 53.

The input image ID storage area 51 serves to store IDs for image files stored on the media card. The IDs are assigned sequentially beginning from 0 based on the number of image files (hereinafter referred to as "input image IDs"). The input image IDs are assigned to the image files in the order that the files are read from the media card.

The input image filename storage area 52 serves to store filenames of the image files. The input image filename storage area 52 is a 256-byte region, with each byte capable of storing data for one character.

The input image file size storage area 53 serves to store numerical values (values in units of kilobytes in this example) indicating the file sizes of the image files.

The motion image data storage area 32 serves to temporarily store data read from the media card for a motion image file being processed. As shown in FIG. 5, the motion image data storage area 32 is provided with a format type storage area 61, a codec type storage area 62, a horizontal size storage area 63, a vertical size storage area 64, a total frame number storage area 65, an extraction position data storage area 66 and an extraction size data storage area 67.

The format type storage area 61 stores data of a type of file format for the motion image file being processed. In the present embodiment, the format type storage area 61 may store one of the values 0, 1, and 2 that have been preassigned to one of three file formats, as shown in FIG. 6A.

The codec type storage area 62 stores data of a type of codec for the motion image file being processed. In the present embodiment, the codec type storage area 62 may store one of the values 0, 1, and 2 that have been preassigned to one of three types of codecs, as shown in FIG. 6B.

The horizontal size storage area 63 stores numerical data indicating the number of pixels in the horizontal direction of the motion image file (frame image) being processed.

The vertical size storage area 64 stores numerical data indicating the number of pixels in the vertical direction for the motion image file (frame image) being processed.

The total frame number storage area 65 stores numerical data indicating a total number of frame images (number of frames) constituting the motion image file being processed.

The extraction position data storage area 66 stores data identifying where each of nine frame images extracted from the motion image file being processed is positioned within the motion image file. More specifically, the extraction position data storage area 66 stores numerical values (values in units of bytes in this example) indicating an amount of offset from the beginning of the motion image file to the start of data for each frame image. A motion image file is configured of data for frame images arranged sequentially between header data at the beginning of the file and index data at the end of the file. Thus, the amount of offset is a value indicating the size of data from the start of the motion image file (the start of the header data in this case) to the start of frame image data targeted for extraction. The amount of offset is stored in units of bytes rather than kilobytes in order to accurately identify the position from which the frame image data begins.

In the present embodiment, the MFP 10 automatically identifies nine frame images, including the first image (the first frame), the last image (the last frame), and seven images (seven frames) distributed equally therebetween, by dividing the total number of frames in the motion image file in eight equal intervals. Specifically, the MFP 10 extracts the nine frame images from the motion image file in chronological order and lays out and prints these frame images in the same order. FIG. 13A illustrates the layout of nine frame images denoted as $0^{th}$ through $8^{th}$ frames. Further, rather than referencing the total number of frames, the motion image file may be divided into eight equal time intervals by referencing the playback time of the motion image, for example.

The extraction size data storage area 67 stores data sizes of the frame image data (in a compressed format) for the extracted nine frame images and also has nine storage areas like the extraction position data storage area 66. Each of these storage areas serves to store a numerical value (a value in units of bytes, for example) indicating the data size of the corresponding frame image.

The nine areas of the extraction position data storage area 66 are correlated with the nine areas of the extraction size data storage area 67. Thus storage areas with the same layout position hold data related to the same frame image.

The output image data storage area 33 serves to temporarily store output image data for a motion image file by sequentially laying out nine frame images extracted from the motion image file as shown in FIG. 13A, and to temporarily store output image data for a still image file by laying out one still image represented by the still image file as shown in FIG. 13B.

The corrected output image data storage area 35 serves to store corrected output image data generated by performing an image correction process (described later) on the output image data.

The enlarged/reduced image data storage area 34 serves to store enlarged/reduced image data generated by converting (expanding or reducing) the corrected output image data to a predetermined thumbnail image size for displaying The frame image data storage area 36 serves to store frame image data extracted from a motion image file. The frame image data stored in this region is in a compressed state (the JPEG format, for example) and has not yet been expanded (decoded).

The print data storage area 37 serves to temporarily store print data for actual printing that has been produced by converting the output image data.

The correction parameter storage area 38 serves to store a correction parameter used during the image correction process. In the present embodiment, a look-up table for gamma Correction is prestored as a correction parameter.

The temporary variable storage area 39 serves to temporarily store variables and counters, such as a page no. counter, cursor position counter, processing page no. variable, generated image counter, process frame image counter, horizontal pixel position counter, vertical pixel position counter, pixel number counter, output image pixel counter and line counter. These variables and counters are used during various processes executed by the CPU 14, as will be described later.

The LCD position data storage area 40 serves to store data indicating a display page (described later) of the selection screen 81, and a display position at which each thumbnail image is to be positioned. As shown in FIG. 7, the LCD position data storage area 40 is provided with an input image ID storage area 71, a display page no. storage area 72, a display image position number storage area 73, a horizontal display coordinate storage area 74 and a vertical display coordinate storage area 75.

The input image ID storage area 71 stores input image IDs for the image files, which correspond to the input image IDs stored in the input image ID storage area 51 of the input image data storage area 31.

The display page no. storage area 72 stores, for each input image ID, a page number of the selection screen 81 on which the thumbnail image for the corresponding image file should be displayed. Since there is a limit to the number of thumbnail images that can be displayed simultaneously on the LCD unit 11 (three in the present embodiment), the user must switch among a plurality of pages of the selection screen 81 when the number of selectable image files exceeds this limit.

Figure 8A:
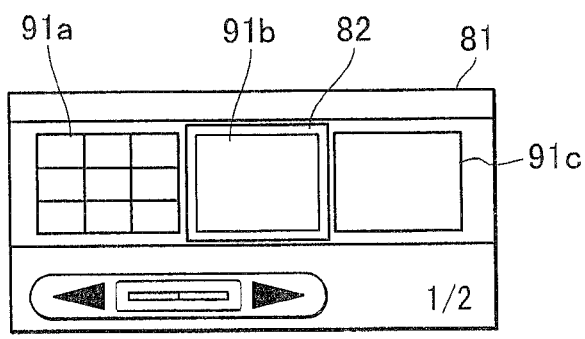
FIG. 8A is a view showing an example of a first page of a selection screen shown on the LCD unit of the multifunctional peripheral according to the first embodiment.
Figure 8B:
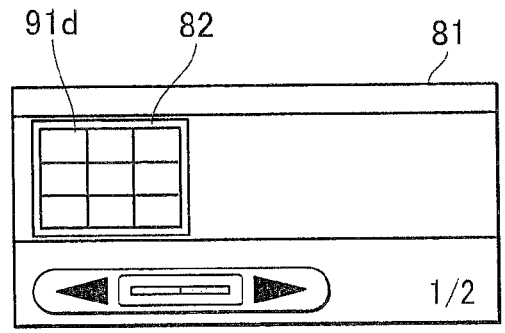
FIG. 8B is a view showing an example of a second page of the selection screen shown in the LCD unit of the multifunctional peripheral according to the first embodiment.

The display image position number storage area 73 stores one of the numbers 0, 1, and 2 to indicate the position at which each thumbnail image should be displayed on the selection screen 81 ($0^{th}$, $1^{st}$, or $2^{nd}$ position from the left). Now assume that four image files are stored on the media card and are assigned input image IDs of 0, 1, 2 and 3. In this case, thumbnail images 91a, 91b and 91c for the image files having IDs of 0-2 are displayed on a first page of the selection screen 81 respectively at left, center and right positions, as shown in FIG. 8A, and the remaining thumbnail image 91d for the image file having ID of 3 is displayed at the left position on a second page, as shown in FIG. 8B.

The horizontal display coordinate storage area 74 stores data for a horizontal image layout starting point indicating a horizontal starting point at which each thumbnail image is to be displayed on the LCD unit 11.

Figure 9:
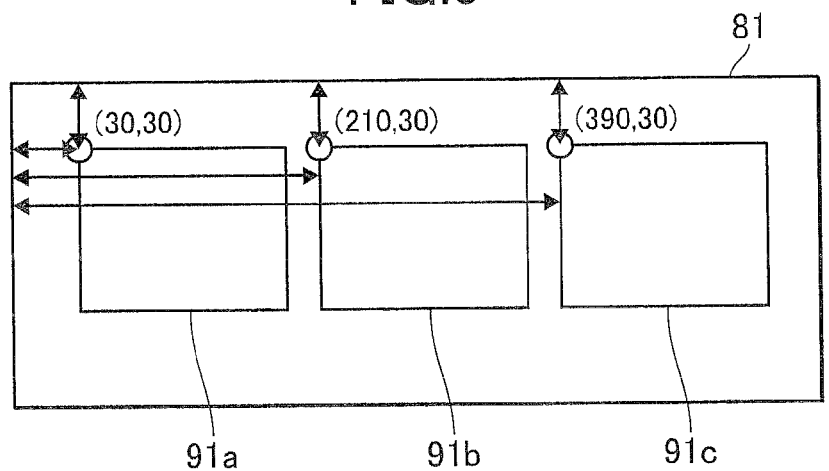
FIG. 9 is a view indicating vertical and horizontal layout starting positions at which each thumbnail image is arranged to be displayed on the selection screen in the first embodiment.

The vertical display coordinate storage area 75 stores data for a vertical image layout starting point indicating a vertical starting point at which each thumbnail image is to be displayed on the LCD unit 11. Each circle in FIG. 9 shows positions corresponding to each combination of coordinates stored in the horizontal display coordinate storage area 74 and the vertical display coordinate storage area 75.

Figure 10:
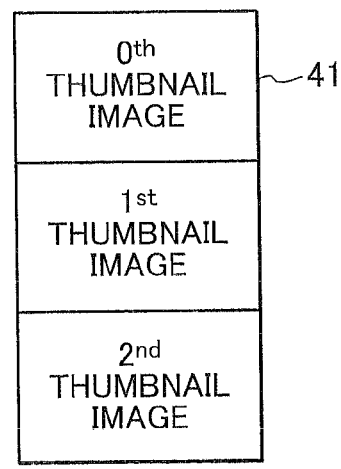
FIG. 10 is a view conceptually showing an LCD image storage area of the RAM in the multifunctional peripheral according to the first embodiment.

The LCD image storage area 41 serves to store thumbnail images to be displayed simultaneously on the LCD unit 11. Specifically, as shown in FIG. 10, the LCD image storage area 41 has a plurality of sub-regions for storing thumbnail images, each sub-region being assigned one of the position numbers $0^{th}$, $1^{st}$, and $2^{nd}$ that correspond to the numbers (0, 1 and 2) stored in the display image position number storage area 73. The thumbnail images 91a, 91b, 91c are respectively stored in the sub-regions of the position numbers $0^{th}$, $1^{st}$ and $2^{nd}$, to display the first page of the selection screen 81. The thumbnail image 91d is stored in the sub-region of the position number $0^{th}$ to display the second page of the selection screen 81.

Next, processes executed by the CPU 14 according to the first embodiment will be described in detail with reference to FIGS. 11 through 16.

The CPU 14 of the MFP 10 performs the following processes (1)-(5):

(1) a media image printing process;
(2) an output image generating process;
(3) an output image correction process;
(4) an LCD image generating process; and
(5) a printing process.

The CPU 14 executes the media image printing process (process (1) described above) when the user performs an operation on the input unit 12 to select a 'media image printing mode' while a media card storing image files is inserted in the media card slot 13. The other processes (2)-(5) are executed as subroutines called during the media image printing process.

First, the media image printing process executed by the CPU 14 of the MFP 10 will be described while referring to a flowchart in FIG. 11.

In S101 at the beginning of this media image printing process, the CPU 14 reads data (a filename and file size) for one image file stored in the media card, In S102 the CPU 14 stores the data read in S101 in the input image data storage area 31 in association with one input image ID. The CPU 14 further, stores the input image ID and display page and position data for the subject image file (data of a display page and position at which a thumbnail image for the subject image file should be displayed) in the input image ID storage area 71, the display page no. storage area 72, the display image position number storage area 73, the horizontal display coordinate storage area 74 and the vertical display coordinate storage area 75 in the LCD position data storage area 40.

In S103 the CPU 14 determines whether data for all image files stored in the media card has been read.

If the CPU 14 determines that data for all image files has not been read (S103: NO), the CPU 14 returns to S101 and reads data for one of the remaining image files.

However, if data has been read for all image files (S103: YES), in S104 the CPU 14 initializes both of the page no. counter and the cursor position counter (prestored in the temporary variable storage area 39) to 0. The page no. counter represents on which page a cursor image 82 (see FIG. 8AB) is currently being located among all the pages available in the selection screen 81. The cursor position counter represents the position at which the cursor image 82 is currently being located among the three thumbnail images simultaneously displayed on one page of the selection screen 81. The page no, counter and the cursor position counter are interlocked with the user's operations of the Up, Down, Left and Right keys in the input unit 12.

In S105 the CPU 14 determines whether the page no. of the selection screen 81 has been updated. Specifically, the processing page no. variable is prestored in the temporary variable storage area 39 for representing a page no. on which an image file currently being processed is located among all the pages available in the selection screen 81. The processing page no. variable is given an initial value of −1. The CPU 14 determines whether the page no. of the selection screen 81 has been updated by the user by comparing the value of the processing page no. variable with the value of the page no. counter, and judges that the page no, has been updated by the user when the two values are different. The processing page no. variable has been set to an initial value of −1 to ensure that the CPU 14 makes a YES determination the first time S105 is performed. After reaching a YES determination in S105, before executing the process of S106, the processing page no. variable is updated to match the value of the page no. counter.

When the CPU 14 determines that the values of the processing page no. variable and the page no. counter are different from each other, i.e., the CPU 14 determines that the page no. was updated by the user (S105: YES), in S106 the CPU 14 sets the input image ID of an image file to be processed (target image file). Here, specifically, the generated image counter has been stored in the temporary variable storage area 39 for counting how many output images have been generated for being displayed on one page of the selection screen 81. The CPU 14 assigns the input image ID for the target image file with an input image ID that is stored in the input image ID storage area 71 in association with a combination of the value in the display page no. storage area 72 that is equal to the value of the page no. counter and the value in the display image position number storage area 73 that is equal to the value of the generated image counter. The value stored in the generated image counter is always reset to 0 when the CPU 14 advances from S105 to S106, In S107 the CPU 14 executes the output image generating process (process (2) described above) on a targeted image file whose input ID has been set in S106. In S107, the CPU 14 generates output image data for the targeted image file (image data representing an image to be printed) in the output image data storage area 33. Details of the output image generating process will be described later with reference to FIGS. 12 to 13B.

In S108 the CPU 14 executes the output image correction process (process (3) described above) on the output image data stored in the output image data storage area 33. Through this process, the CPU 14 performs corrections on the output image data that was stored in the output image data storage area 33 in S107 and stores the corrected output image data in the corrected output image data storage area 35. Details of the output image correction process will also be described later with reference to FIG. 14.

In S109 the CPU 14 executes the LCD image generating process (process (4) described above) on the corrected output image data that was stored in the corrected output image data storage area 35 (as a result of the output image correction process executed in S108) to generate a thumbnail image for the targeted image file and stores the thumbnail image in the LCD image storage area 41 at a position having the position number indicated by the generated image counter. Details of the LCD image generating process will also be described later with reference to FIG. 15.

In S110 the CPU 14 determines whether one screenful of thumbnail images has been generated. The CPU 14 increments the generated image counter by 1 in S110 upon determining that one screenful of thumbnail images has not been generated (S110: No) and returns to S106 to generate another thumbnail image.

Specifically, in S110 the CPU 14 determines whether one screenful of thumbnail images has been generated based on whether the value of the generated image counter has reached the maximum number of images that can be displayed in one screen (since three images can be displayed simultaneously in the selection screen 81 in the present embodiment, the maximum image number is set to two because the initial value of the generated image counter is 0).

Further, if there are less than three thumbnail images in the last page to be displayed on the selection screen 81, the CPU 14 determines that one screenful of thumbnail images has been generated by referring to the input image ID in addition to the value of the generated image counter. If the input image ID indicates that the target image file is the last file, even though the value of the generated image counter does not reach the maximum number (i.e., the current value of the generated image counter remains either 0 or 1 in this example), the CPU 14 does not endlessly repeat the process S106-S110 but determines that one screenful of thumbnail images has been generated in S110.

When one screenful of thumbnail images is determined to have been generated (S110: YES), in S111 the CPU 14 displays the image data stored in the LCD image storage area 41 on the LCD unit 11, and subsequently advances to S112.

The CPU 14 also jumps to S112 after determining in S105 that the page no. was not updated by the user.

In S112 the CPU 14 displays a cursor image 82 on the selection screen 81 at a position associated with the cursor position counter. As shown in FIGS. 8A and 8B, the cursor image 82 in the present embodiment is a yellow border surrounding a thumbnail image displayed on the selection screen 81 in the LCD unit 11.

In S113 the CPU 14 receives data inputted from the input unit 12 when the user presses an operating key in the input unit 12.

In S114 the CPU 14 determines based on the data inputted in S112 whether the pressed key was the OK key or another key, such as the Up key, Down key, Left key, or Right key.

If the CPU 14 determines in S114 that the pressed key was a key other than the OK key, in S115 the CPU 14 updates the page no. counter and/or the cursor position counter.

For example, when the pressed key was the Down key or Right key, the CPU 14 increments the cursor position counter by 1 in order to move the position of the cursor image 82 rightward one place. However, if the value of the cursor position counter exceeds the maximum value (2 in the present embodiment since the counter was initially set to 0) as a result of this increment, such as when the Down key or Right key was pressed when the cursor image 82 is in the rightmost position, the CPU 14 resets the cursor position counter to 0 and increments the page no. counter by 1. In this case, if the value of the page no. counter would exceed the maximum value (the page number of the last page—1, since the counter is initially set to 0) as a result of this increment, i.e., when there is no next page, the CPU 14 maintains the page no, counter at the maximum value without incrementing the counter.

On the other hand, if either the Up key or Left key was pressed in S114, the CPU 14 decrements the cursor position counter by 1 in order to move the position of the cursor image 82 leftward one place. In this case, if the value of the cursor position counter would be less than 0 following this decrementing operation, such as when the Up key or Left key was pressed when the cursor image 82 was already in the leftmost position, the CPU 14 resets the cursor position counter to 0 and decrements the page no. counter by 1. In this case, if the value of the page no. counter would be less than 0 as a result of the decrementing operation, i.e., when no previous page exists, the CPU 14 maintains the value of the page no. counter at 0 without decrementing the counter.

The CPU 14 returns to S105 after finishing S115.

However, if the CPU 14 determines in S114 that the pressed key was the OK key, in S116 the CPU 14 assigns the input image ID for an image file to be printed with an input image ID that is stored in the input image ID storage area 71 in association with a combination of the value of the display page no. storage area 72 that is equal to the current value of the page no. counter and the value of the display image position number storage area 73 that is equal to the current value of the cursor position counter.

In S117 the CPU 14 executes the output image generating process on the image file having the input image ID set as the printing target in S116. As a result of this process, output image data for the targeted image file (image data representing the print image) is generated in the output image data storage area 33.

In S118 the CPU 14 executes the output image correction process on the output image data that was stored in the output image data storage area 33 in S117. Through this process, the output image data generated in S117 is corrected and the corrected output image data is stored in the corrected output image data storage area 35.

In S119 the CPU 14 executes the printing process (process (5) described above) on the corrected output image data stored in the corrected output image data storage area 35 as a result of the output image correction process executed in S118 and subsequently ends the current media image printing process. Details of the printing process will also be described later with reference to FIG. 16.

Next, the output image generating process (process (2) described above) executed in S107 and S117 of the media image printing process will be described with reference to a flowchart in FIG. 12. The output image generating process is configured to be executed in S107 on the image file whose ID has been set in S106 to be displayed on the selection screen 81, while to be performed in S117 on the image file whose ID has been set in S116 as a target to be printed.

In S201 at the beginning of the output image generating process, the CPU 14 determines the type of the targeted image file by referencing the header data therein. Specifically, the CPU 14 refers to the filename stored in the input image filename storage area 52 in association with the ID of the targeted image file in the input image data storage area 31. By using the filename, the CPU 14 directly accesses the target image file stored on the media card and refers to the header data therein.

In S202 the CPU 14 determines whether the type of image file determined in S201 is classified as a still image file or a motion image file.

If the CPU 14 determines in S202 that the image file is a motion image file, then in S203 the CPU 14 executes a process to analyze the motion image file. Through this analytical process, the CPU 14 acquires format type data and codec type data for the motion image file. The CPU 14 stores these data respectively in the format type storage area 61 and codec type storage area 62 of the motion image data storage area 32 (See FIG. 5).

In S204 the CPU 14 executes a process to extract motion image parameters from the motion image file. Through this extraction process, the CPU 14 acquires horizontal size data, vertical size data, and total frame number data for the motion image file; and the extraction position data and extraction size data for each of the nine frames to be extracted. The CPU 14 stores these data respectively in the horizontal size storage area 63, vertical size storage area 64, total frame number storage area 65, extraction position data storage area 66, and extraction size data storage area 67 of the motion image data storage area 32, as shown in FIG. 5. If data for a different motion image file has already been stored in the motion image data storage area 32 at this time, the CPU 14 first deletes the existing data before storing the data for the motion image file currently being processed (overwrites the existing data).

In S205 the CPU 14 performs a process to read, from the motion image file, data of a frame image to be processed from among the nine frame images ($0^{th}$ through $8^{th}$ frames) based on the extraction position data and extraction size data stored in the extraction position data storage area 66 and extraction size data storage area 67, respectively. Here, the process frame image counter prestored in the temporary variable storage area 39 is given an initial value of 0, and the CPU 14 targets data for the frame image corresponding to the value of the process frame image counter. As will be described later, the value of the process frame image counter is incremented after processing data for each frame image.

In S206 the CPU 14 stores the frame image data read in S205 in the frame image data storage area 36.

In S207 the CPU 14 performs an expansion (decoding) process on the frame image data stored in the frame image data storage area 36 and converts this data to a format in which pixel calculations are possible (such as image data expressing RGB values for each pixel as numerical values from 0 to 255).

In S208 the CPU 14 stores or lays out the pixel data expanded in S207 at a position in the output image data storage area 33 corresponding to the frame image being processed. When executing S208, if output image data for another image file has already been stored in the output image data storage area 33, the CPU 14 first deletes the existing output image data before storing the new output image data for the currently targeted image file (i.e., overwrites the existing data).

In S209 the CPU 14 determines whether the expansion process and layout process have been performed for all frame images. Specifically, the CPU 14 increments the process frame image counter by 1 each time processing of S207-S208 for one frame image is completed. The CPU 14 determines that the expansion process and layout process have been performed on all frame images when the value of the process frame image counter reaches the value (the number of frame images to be laid out—1), i.e., eight in the present embodiment.

If the CPU 14 determines that the expansion process and layout process have not been completed for all frame images (S209: NO), the CPU 14 returns to S205 and repeats the above process on data for an unprocessed frame image. By repeatedly executing the processes of S205-S209, the CPU 14 lays out the nine frame images in their order of extraction (i.e., based on their positional order in the motion image), as illustrated in FIG. 13A. In the present embodiment, no margin is provided around each frame image when the frame images are laid out, but a margin may be provided instead.

However, if the CPU 14 determines that the expansion process and layout process have been completed for all frame images (S209: YES), the CPU 14 ends the current output image generating process. At this time, the image data stored in the output image data storage area 33 (pixel data representing an image in which nine frame images are laid out) is the output image data for the motion image file.

On the other hand, if the CPU 14 determines in S202 described above that the image file is a still image file, then in S210 the CPU 14 performs an expansion process on the still image file to convert the image data in the still image file to a format in which pixel calculations are possible.

In S211 the CPU 14 stores the image data expanded in S210 in the output image data storage area 33, and subsequently ends the current output image generating process. In other words, for still image files, unlike motion image files, a single still image is laid out in the output image data storage area 33, as illustrated in FIG. 13B. At this time, the image data stored in the output image data storage area 33 (pixel data representing a still image) is the output image data for the still image file.

Next, the output image correction process (process (3) described above) executed by the CPU 14 of the MFP 10 will be described with reference to a flowchart in FIG. 14.

In S501 at the beginning of the output image correction process, the CPU 14 performs a process to designate a starting point for reading pixel data of an image to be corrected from the output image data storage area 33. In the present embodiment, the CPU 14 is configured to start reading pixel data of the targeted image from a first pixel in the output image data storage area 33. That is, a position to read pixel data is initially set to the first pixel in the output image data storage area 33. In this way, all the image data (pixel data) stored in the output image data storage area 33 are configured to be read sequentially from the beginning.

In S502, the CPU 14 reads one pixel of the targeted image data from the reading point set in the output image data storage area 33.

In S503 the CPU 14 executes gamma correction on the pixel data read in S502. Specifically, the CPU 14 calculates an output pixel value based on the read pixel data (pixel value) and the look-up table for gamma correction prestored in the correction parameter storage area 38.

In S504 the CPU 14 stores the pixel data corrected in S503 in the corrected output image data storage area 35.

In S505 the CPU 14 updates the reading point to a pixel data next to the pixel read in S502. Specifically, the CPU 14 increments the horizontal pixel position counter by one. The horizontal pixel position counter has been prestored in the temporary variable storage area 39 and represents a pixel position in the horizontal direction. When the value of the horizontal pixel position counter reaches a predetermined upper limit thereof, the CPU 14 resets the horizontal pixel position counter, and increments the vertical pixel position counter, which represents a pixel position in the vertical direction, by one.

In S506 the CPU 14 determines whether the correction process has been executed on all pixels in the targeted image data. Specifically, in the present embodiment, the pixel number counter prestored in the temporary variable storage area 39 is given an initial value of 0. The CPU 14 increments this pixel number counter by one each time the correction process is performed on one pixel in S503. The CPU 14 determines that the correction process has been executed for all pixels in the targeted image when the value of the pixel number counter reaches the number of pixels in the output image data stored in the output image data storage area 33.

The CPU 14 returns to S502 upon determining in S506 that the correction process has not been executed for all pixels in the targeted output image data (S506: No).

On the other hand, if the CPU 14 determines that the correction process has been completed for all pixels (S506: YES), the CPU 14 terminates the current output image correction process.

Next, the LCD image generating process (process (4) described above) executed in S109 of the media image printing process will be described with reference to a flowchart in FIG. 15. The LCD image generating process is configured to be executed on the corrected output image data that has been generated in S108 for the targeted image file whose ID has been set in S106.

In S301 at the beginning of the LCD image generating process, the CPU 14 executes a process to enlarge or reduce the targeted image data (the corrected output image data stored in the corrected output image data storage area 35). Here, through this enlargement/reduction process, the CPU 14 generates an enlarged/reduced image (thumbnail image) by converting (enlarging or reducing) the targeted image data to a predetermined size for thumbnail images. The CPU 14 determines whether to execute an enlargement process or a reduction process by comparing the pixel size of the targeted image data with the pixel size of thumbnail images to be displayed on the LCD unit 11.

Usually the reduction process is performed on the targeted image data since the pixel size of the targeted image data is normally greater than that of the thumbnail images. However, conceivably, the pixel size of the targeted image data could be smaller than that of the thumbnail images, in which case the enlargement process would be executed on the targeted image data. It is also conceivable that the pixel size of the targeted image data could be the same as that of the thumbnail images, in which case it is not necessary to perform an enlargement or reduction process on the image data. The enlargement and reduction processes are performed using well known algorithms, such as the nearest neighbor algorithm, bilinear algorithm, or bicubic algorithm, to generate an enlarged/reduced image one pixel at a time.

In S302 the CPU 14 stores the image data resulting from the enlargement/reduction process of S301 in the enlarged/reduced image data storage area 34.

In S303 the CPU 14 determines whether the enlargement/reduction process has been executed on all pixels in the targeted image data. In the present embodiment, the output image pixel counter has been prestored in the temporary variable storage area 39 for counting the number of pixels on which the enlargement/reduction process has already been completed. The output image pixel counter is given an initial value of 0. The CPU 14 increments this output image pixel counter by one each time the process in S301 is performed. The CPU 14 determines that the enlargement/reduction process has been executed for all pixels in the targeted image when the value of the output image pixel counter reaches the number of pixels in the targeted image data.

The CPU 14 returns to S301 upon determining in S303 that the enlargement/reduction process has not been executed for all pixels in the targeted image (S303: No).

However, if the CPU 14 determines that the enlargement/reduction process has been completed for all pixels (S303: YES), in S304 the CPU 14 copies the data stored in the enlarged/reduced image data storage area 34 to a region of the LCD image storage area 41 that is associated with a display position number for the targeted image file (see FIG. 10) which is indicated by the current value of the generated image counter. Subsequently, the CPU 14 ends the LCD image generating process.

Figure 16:
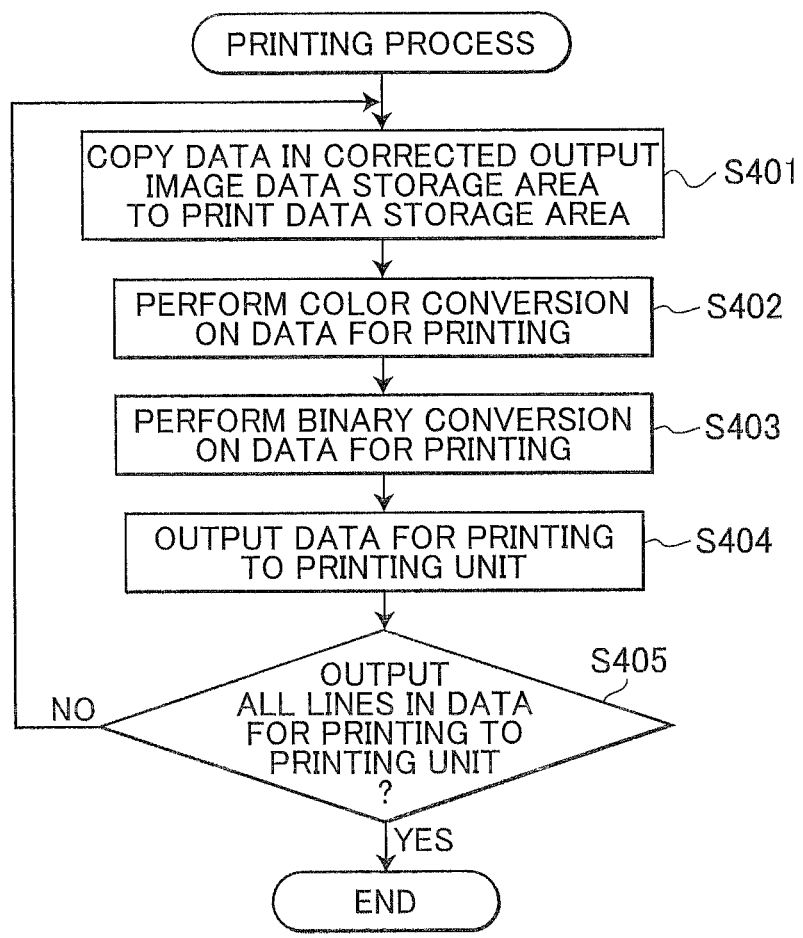
FIG. 16 is a flowchart of a printing process in the media image printing process according to the first embodiment.

Next, the printing process (process (5) described above) executed in S119 of the media image printing process will be described with reference to a flowchart in FIG. 16. The printing process is executed on the corrected output image data generated and stored in the corrected output image data storage area 35 in S118.

In S401 at the beginning of the printing process, the CPU 14 copies one line worth of the corrected output image data stored in the corrected output image data storage area 35 to the print data storage area 37. If the size of the corrected output image is 1600 pixels horizontally×1200 pixels vertically, for example, one line would be 1600×1 pixels.

In S402 the CPU 14 performs color space conversion for converting pixel data in the print data storage area 37 from RGB values to CMYK values. More specifically, the CPU 14 performs an RGB→CMY conversion on the pixel data using a color conversion method well known in the art, and performs CMY→CMYK conversion on the resulting data using a GCR process well known in the art.

In S403 the CPU 14 converts the pixel data in the print data storage area 37 to binary data for printing in each of the CMYK colors. This binary conversion is performed using processes well known in the art, such as the error diffusion method and dither matrix method.

In S404 the CPU 14 outputs the binary data produced in S403 to the printing unit 18, whereby the printing unit 18 performs a printing operation based on this binary data.

In S405 the CPU 14 determines whether the above process has been completed for all lines of the corrected output image data. In the present embodiment, the line counter having an initial value of 0 has been prestored in the temporary variable storage area 39. The CPU 14 increments this line counter by one each time the process described above has been completed for one line. The CPU 14 determines whether the process has been completed for all lines of the corrected output image data when the value of the line counter reaches the number of lines of the corrected output image data stored in the corrected output image data storage area 35.

The CPU 14 returns to S401 when determining in S405 that there remain lines to be processed (S405: No).

When the process has been completed for all lines (S405: YES), the CPU 14 ends the current printing process.

As described above, the MFP 10 according to the present embodiment displays the selection screen 81 with which a user can select an image file to print. The MFP 10 displays images in the selection screen 81 for selecting image files that are candidates for printing. The displayed images give the user a good idea of what the actual printed image will look like if the image file is selected. Accordingly, the user of the MFP 10 can more effectively select image files to obtain desired printed images.

In other words, if only a thumbnail image of one frame image from the motion image file were displayed, this frame image may differ from the images that the user will actually be printing. Hence, the user must select an image file without knowing exactly what images are available for printing in the motion image file. Thus, in some cases the user will not find a desired printed image in the selected image file and must search through several image files in an effort to find the desired image. The MFP 1 according to the present embodiment solves this problem by displaying images the same as print images in the selection screen 81 for selection.

Further, since the MFP 10 of the present embodiment can print an image in which a plurality of frame images has been laid out on the same page, the MFP 10 is configured to display an image having a combination of frame images as a thumbnail image for selection. Arranging a plurality of frame images on a single page also enables the user to more easily identify the content of a motion image than when only one frame image of the motion image is displayed as a selectable image. Printing a plurality of images on a single page is more suited to motion images than still images, particularly when the frame images of the motion image are smaller in size than the still images, since frame images of a motion image may appear grainy and poorer in quality when printed at an enlarged size.

Further, the MFP 10 of the present embodiment is configured to perform correction on an output image in which a plurality of frame images has been laid out on a single page. This configuration allows the MFP 10 to perform corrections more efficiently than a configuration in which a correction process is to be executed on the plurality of frame images one frame image by one frame image, Moreover, it is conceivable that each frame image could be reduced in size when laid out on a single page. In this case, the pixel size (number of pixels) to be corrected becomes smaller than that before correction. Especially in the present embodiment, a margin is not provided around each frame image when the frame images are laid out. This configuration is advantageous in that there is no need for the MFP 10 to perform the correction process on the margin whose constituent pixels have RGB values of (255, 255, 255).

Further, the MFP 10 according to the present embodiment displays, as selectable images, thumbnail images of output images on which the correction process has been performed. Hence, the user can select an image file to be printed more appropriately than when the thumbnail images are displayed without being corrected.

The MFP 10 of the present embodiment can also allow the user to select an image file to be printed from among a combination of motion image files and still image files. This eliminates the inconvenience of having to select motion image files and still image files using different modes when both file types are stored on the same media card.

Further, since the MFP 10 of the present embodiment displays a row of thumbnail images for a plurality of image files in the selection screen 81 as selectable images, the user can compare output images of different image files when selecting an image file to print.

Next, a multifunctional peripheral 10 (which will also be referred to as "MFP 10") according to a second embodiment will be described with reference to FIG. 17.

The MFP 10 according to the second embodiment calculates an image correction parameter from each output image data. In other words, while the MFP 10 according to the first embodiment performs corrections using a fixed correction parameter prestored in the correction parameter storage area 38, the MFP 10 according to the second embodiment computes or calculates a correction parameter to be used for each output image data based on the subject output image data.

Hereinafter, a description will be given only for what is different from the first embodiment, while what is common to the first embodiment will not be described in order to avoid duplicating description.

Figure 11:
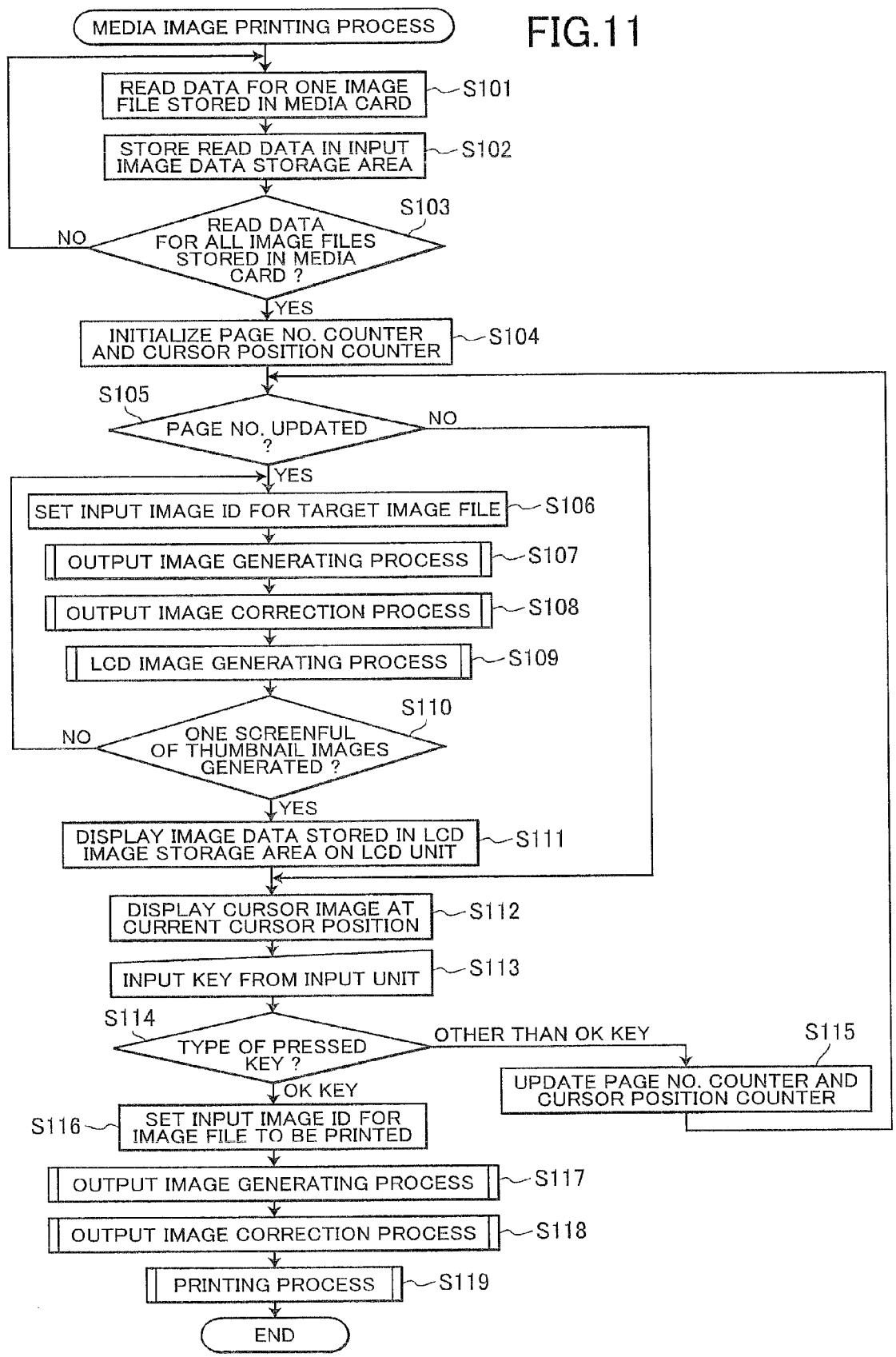
FIG. 11 is a flowchart of a media image printing process executed by the CPU of the multifunctional peripheral according to the first embodiment.
Figure 17:
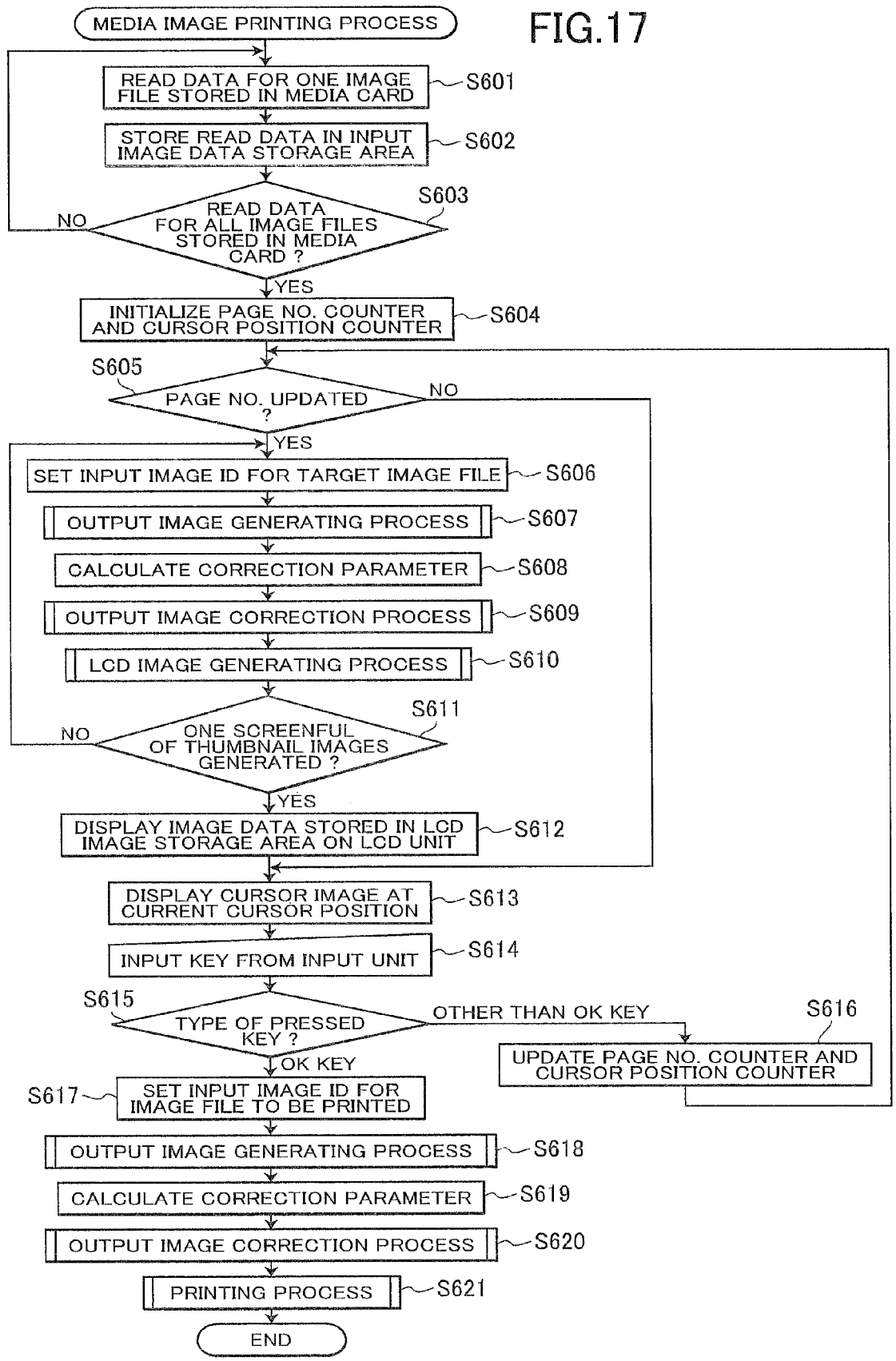
FIG. 17 is a flowchart of a media image printing process executed by the CPU of the multifunctional peripheral according to a second embodiment.

Referring to a flowchart in FIG. 17, in a media image printing process executed by the MFP 10 in the second embodiment, processes executed in S601-S607, S609-S618 and S620-S621 are the same as those executed in S101-S119 in the media image printing process of the first embodiment shown in FIG. 11. That is, processes S608 and S619 are added to the media image printing process of the first embodiment.

In S608 the CPU 14 calculates an image correction parameter based on the output image data that was stored in the output image data storage area 33 in S607. Specifically, the image correction parameter is derived using a well-known computing method, such as a histogram correction parameter computing method in an LUT format. The image correction parameter calculated in S608 is stored in the correction parameter storage area 38 for a later use in the output image correction process in S609. The process executed in S619 is the same as the process in S608 described here except that in S619 the CPU 14 calculates the image correction parameter based on the output image data that was stored in the output image data storage area 33 in S618.

As described above, the MFP 10 according to the second embodiment is so configured as to calculate a correction parameter appropriate for the output image data based on the subject output image data in which a plurality of frame images is laid out on a single page. Hence, the MFP 10 can calculate the correction parameter more easily in a shorter processing time than a case in which an image correction parameter were calculated for each frame image. The MFP 10 can also calculate a correction parameter appropriate for an output image for a still image file based on the subject output image.

Next, a third embodiment of the present invention will be described with reference to FIGS. 18 and 19.

The multifunctional peripheral 10 according to the third embodiment (also to be referred to MFP 10) is characterized in that the MFP 10 calculates an image correction parameter from the frame image data. That is, in comparison to the second embodiment in which the MFP 10 derives the image correction parameter from the output image data (in which the plurality of frame image data has been laid out), the MFP 10 according to the third embodiment computes the image correction data in accordance with the frame image data.

Specifically, the third embodiment is different from the first embodiment partially in the output image generating process and in the internal memory (RAM) 16. Hereinafter, only differences will be described, while descriptions for like parts and components will be omitted.

Figure 18:
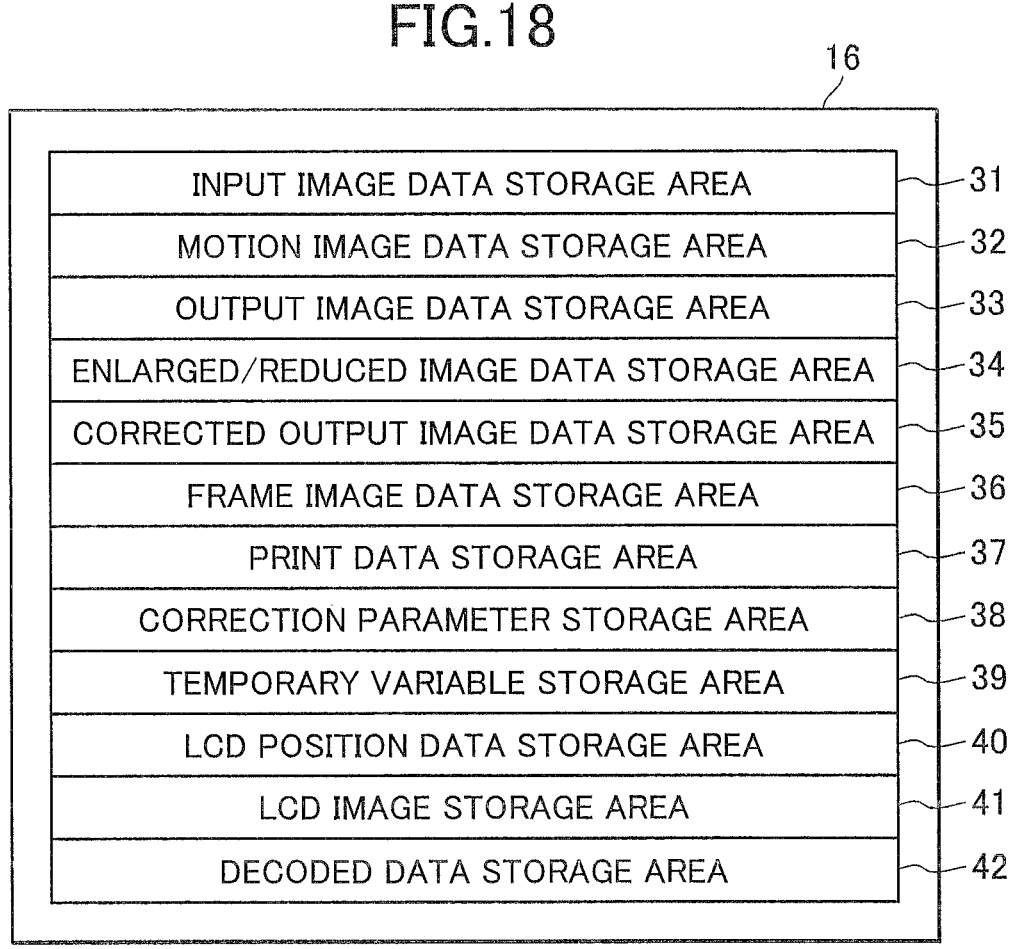
FIG. 18 is a view conceptually illustrating internal storage areas of the RAM according to a third embodiment.

As shown in FIG. 18, the RAM 16 of the third embodiment is additionally provided with a decoded data storage area 42. The decoded data storage area 42 stores decoded image data which is the frame image data or still image data on which the expansion/reduction process (decoding process) has been performed.

Figure 19:
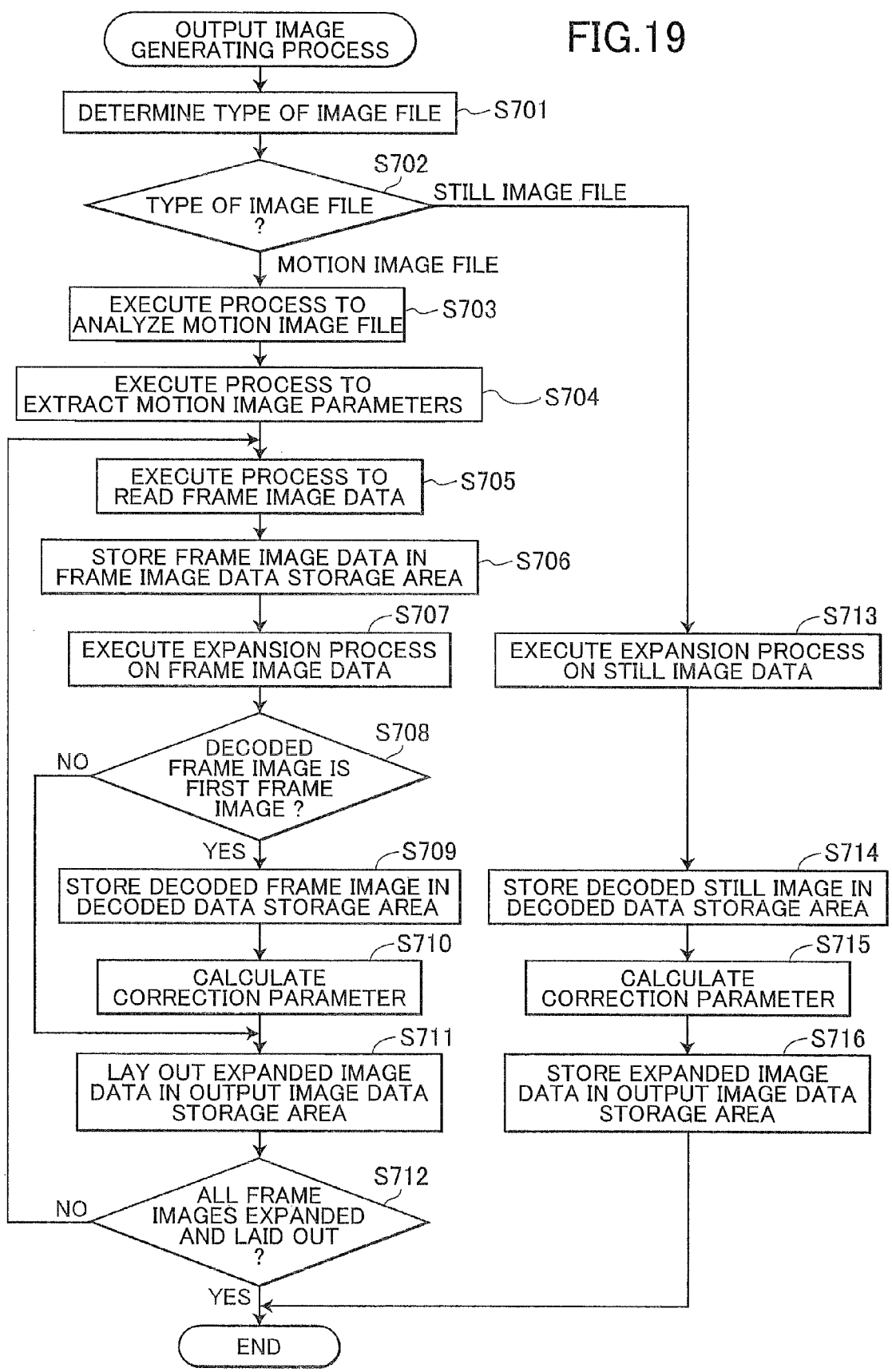
FIG. 19 is a flowchart of an output image generation process in a media image printing process according to the third embodiment.

Referring to a flowchart in FIG. 19 illustrating an output image generating process according to the third embodiment, processes executed in S701-S707, S711-S712, S713 and S716 are the same as the process S201-211 in the output image generating process of the first embodiment (FIG. 12). For short, processes S708-S710, S714 and S715 are added to the first embodiment.

In S708 the CPU 14 determines whether the frame image data decoded in S707 is the first frame image out of the nine frame images extracted from the image file representing a motion image.

Upon determining in S708 that the frame image data being processed is the first frame image (S708:Yes), in S709 the CPU 14 stores the frame image data decoded in S707 in the decoded data storage area 42.

In S710 the CPU 14 calculates the image correction parameter from the first frame image data that is stored in the decoded data storage area 42. Specifically, the image correction parameter can be derived using a computing method well-known in the art, such as the histogram correction parameter computing method in the LUT format. Subsequently, the CPU 14 proceeds to S711.

On the other hand, if the CPU 14 determines that the frame image data being processed is not the first frame image (S708: No), the CPU 14 jumps directly to S711.

Turing to a flow along which an image file representing a still image follows, in S714 the CPU 14 stores the still image data decoded in S713 in the decoded data storage area 42.

In S715 the CPU 14 calculates the image correction parameter based on the decoded still image data (output image data) stored in the decoded data storage area 42. Specifically, just as in S710, the image correction parameter can be derived using a computing method well-known in the art, such as the histogram correction parameter computing method in the LUT format. Subsequently, the CPU 14 ends the output image generating process.

As described above, the MFP 10 according to the third embodiment is configured to calculate the image correction parameter for a motion image file based on the first frame image data that has been extracted from the motion image file. Hence, this configuration allows an image correction parameter to be more accurate and faithful to the original motion, image file, therefore, more appropriate to the original motion image file, if compared to a configuration in which an image correction parameter is calculated from an output image in which a plurality of frame images whose size could have been reduced is laid out on a single page.

While the present invention has been described in detail with reference to the embodiment thereof, it would be apparent to those skilled in the art that various changes and modifications may be made therein without departing from the spirit of the invention.

For example, the MFP 10 according to the above embodiments automatically identifies nine frame images to be extracted from a motion image file, but the present invention is not limited to this configuration. For example, the MFP 10 may prompt the user to select which frame images are to be extracted. Further, the number of frame images to be extracted from a motion image file is not limited to nine and need not be fixed to any specific number. The user may be prompted to specify the number of frame images to be extracted.

Further, the MFP 10 according to the third embodiment calculates an image correction parameter based on a first frame image data extracted from a motion image file. However, as a variation, the MFP 10 may be so configured as to calculate image correction parameters for all frame images extracted from a motion image file and to obtain an average value of all the calculated image correction parameters for use in the image correction process. Or alternatively, the MFP 10 may be configured to calculate image correction parameters for at least one frame image extracted from a motion file. In this case as well, the MFP 10 may obtain an average value of the calculated correction parameters.

Further, the present invention has been applied to a multifunctional peripheral as an example of printing devices according to the present embodiment, but the present invention may also be applied to a printing device other than a multifunctional peripheral, such as a printer without scanning function.

Further, the present invention may also be applied to a computer connectable with a printing device. In this case, a driver program for controlling operations of the connected printing device is installed on a ROM, an HDD or the like in the computer. By executing the driver program, the computer performs the above-described processes (1) to (5), just like the MFP 10. That is, the computer reads image files (motion image files and still image files) from a media card inserted in the computer, generates output images for the image files, corrects the output images, displays thumbnail images corresponding to the corrected output images on a display unit of the computer for selection, and controls the printing device to print an output image corresponding to the thumbnail image selected by a user. The driver program may be originally stored on a recording medium, such as a CD-ROM, and installed on the computer.

What is claimed is:

1. A printing device comprising:
   a retrieving unit configured to retrieve a plurality of image files, each representing a motion image;
   an output image generating unit configured to generate a plurality of first output images from the plurality of image files, each first output image being generated from each of the image files, respectively, such that a plurality of frame images extracted from a corresponding image file are laid out in each first output image;
   a corrected image generating unit configured to generate a plurality of first corrected output images from the plurality of first output-images, respectively, each first corrected output image being generated by correcting a corresponding first output image using a particular correction parameter determined specifically for the corresponding first output image;
   a displaying unit configured to display the plurality of first corrected output images in a selection screen for selection, the plurality of first corrected output images being displayed adjacent to one another;
   a selection accepting unit configured to accept a selection of one from among the plurality of first corrected output images displayed in the selection screen as a selected first corrected output image; and
   a printing unit configured to print the selected first corrected output-image.

2. The printing device according to claim 1, further comprising a calculating unit configured to calculate an output image correction parameter for each first output image based on each first output image, respectively,
   wherein the corrected image generating unit is configured to correct each first output image using a corresponding output image correction parameter to generate each first corrected output image.

3. The printing device according to claim 1, further comprising a calculating unit configured to calculate a frame image correction parameter for each first output image based on at least one of the plurality of frame images extracted from each image file, respectively,
   wherein the corrected image generating unit is configured to correct each first output image by using a corresponding frame image correction parameter to generate each first corrected output image.

4. The printing device according to claim 3, wherein the frame image correction parameter is calculated based on a first frame image that indicates a first frame of a motion image represented by each image file, and that is one of the plurality of frame images extracted from corresponding image file.

5. The printing device according to claim 1, wherein the retrieving unit is further configured to retrieve at least one image file each representing a still image;
   the printing device further comprises an identifying unit configured to identify which of a motion image and a still image is represented by each image file, the output image generating unit generating, from an image file that is identified to represent a still image, a second output image in which the still image is laid out, the corrected image generating unit is further configured to generate at least one second corrected output image from the at least one second output image, respectively, each second corrected output image being generated by correcting a corresponding second output image using a particular correction parameter determined specifically for the corresponding second output image;

the displaying unit is further configured to display, in the selection screen, the at least one second corrected output image;

the selection accepting unit is further configured to accept a selection of one second corrected output image from among the at least one second corrected output image and the plurality of first corrected output images displayed in the selection screen, as a selected second corrected output image; and the printing unit is further configured to print the selected second corrected output image.

6. The printing device according to claim 5, wherein the displaying unit is configured to display the plurality of first corrected output image and the at least one second corrected output image in the selection screen as being arranged adjacent to one another.

7. A computer readable storage device storing a program executable on a printing device, the program including a set of program instructions comprising:

retrieving a plurality of image files, each representing a motion image;

generating a plurality of first output images from the plurality of image files, each first output image being generated from each of the image files, respectively, such that a plurality of frame images extracted from a corresponding image file are laid out in each first output image;

generating a plurality of first corrected output images from the plurality of first output-images, respectively, each first corrected output image being generated by correcting a corresponding first output image using a particular correction parameter determined specifically for the corresponding first output image;

displaying the plurality of first corrected output images in a selection screen for selection, the plurality of first corrected output images being displayed adjacent to one another;

accepting a selection of one from among the plurality of first corrected output images displayed in the selection screen as a selected first corrected output image; and printing the selected first corrected output image.

8. The computer readable storage device according to claim 7, the set of program instructions further comprising calculating an output image correction parameter for each first output image based on each first output image, wherein each first output image is corrected using a corresponding output image correction parameter to generate each first corrected output image.

9. The computer readable storage device according to claim 7, the set of program instructions further comprising calculating a frame image correction parameter for each first output image based on at least one of the plurality of frame images extracted from each image file, respectively, wherein each first output image is corrected using a corresponding frame image correction parameter to generate each first corrected output image.

10. The computer readable storage device according to claim 9, wherein the frame image correction parameter for each first output image is calculated based on a first frame image that indicates a first frame of a motion image represented by each image file, and that is one of the plurality of frame images extracted from the corresponding image file.

11. The computer readable storage device according to claim 7, the set of program instructions further comprising:

retrieving at least one image file, each representing a still image;

identifying which of a motion image and a still image is represented by each image file;

generating, from at least one image file that is identified to represent a still image at least one second output image in which the still image is laid out, respectively;

correcting each second output image using a particular correction parameter determined specifically for a corresponding second output image to generate at least one second corrected output image, respectively;

displaying the at least one second corrected output image in the selection screen for selection;

accepting a selection of one second corrected output image from among the at least one second corrected output image and the plurality of first corrected output images displayed in the selection screen as a selected second corrected output image; and printing the selected second corrected output image.

12. The computer readable storage device according to claim 11, wherein the plurality of first corrected output image and the at least one second corrected output image are displayed in the selection screen as being arranged adjacent to one another.

13. A computer readable storage device storing a program executable on a computer connectable to a printing device, the program including a set of program instructions comprising:

retrieving a plurality of image files, each representing a motion image;

generating a plurality of first output images from the plurality of image files, each first output image being generated from each of the image files, respectively such that a plurality of frame images extracted from a corresponding image file are laid out in each first output image;

generating a plurality of first corrected output images from the plurality of first output-images, respectively, each first corrected output image being generated by correcting a corresponding first output image using a particular correction parameter determined specifically for the corresponding first output image;

displaying the plurality of first corrected output images in a selection screen for selection, the plurality of first corrected output images being displayed adjacent to one another;

accepting a selection of one from among the plurality of first corrected output images displayed in the selection screen as a selected first corrected output image; and controlling the printing device to print the selected first corrected output image.

* * * * *